US008280995B2

(12) United States Patent
Miyamoto et al.

(10) Patent No.: US 8,280,995 B2
(45) Date of Patent: Oct. 2, 2012

(54) SYSTEM AND METHOD FOR SUPPORTING DYNAMIC SELECTION OF COMMUNICATION MEANS AMONG USERS

(75) Inventors: Kohtaroh Miyamoto, Fuchu (JP); Shuichi Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 12/252,430

(22) Filed: Oct. 16, 2008

(65) Prior Publication Data

US 2009/0112993 A1  Apr. 30, 2009

(30) Foreign Application Priority Data

Oct. 24, 2007 (JP) ................. 2007-276931

(51) Int. Cl.
*G06F 15/173* (2006.01)
*G06F 17/28* (2006.01)
(52) U.S. Cl. .................... 709/223; 704/7
(58) Field of Classification Search .......... 709/201–207, 709/217–229; 704/7
See application file for complete search history.

(56) References Cited

U.S. PATENT DOCUMENTS

| | | | | |
|---|---|---|---|---|
| 7,620,408 | B2 * | 11/2009 | Ye et al. | 455/466 |
| 7,962,857 | B2 * | 6/2011 | Plestid et al. | 715/780 |
| 2002/0161862 | A1 * | 10/2002 | Horvitz | 709/220 |
| 2003/0013438 | A1 * | 1/2003 | Darby | 455/419 |
| 2003/0135569 | A1 * | 7/2003 | Khakoo et al. | 709/206 |
| 2004/0243392 | A1 * | 12/2004 | Chino et al. | 704/7 |
| 2005/0144255 | A1 * | 6/2005 | Hennecke | 709/217 |
| 2007/0099701 | A1 * | 5/2007 | Simon et al. | 463/40 |
| 2007/0168863 | A1 * | 7/2007 | Blattner et al. | 715/706 |
| 2010/0296634 | A1 * | 11/2010 | Schulzrinne et al. | 379/45 |

FOREIGN PATENT DOCUMENTS

JP  2001321571 A2  11/2001

* cited by examiner

*Primary Examiner* — Shirley Zhang
(74) *Attorney, Agent, or Firm* — Gail H. Zarick; Anne Vachon Dougherty

(57) ABSTRACT

A system, method and computer program product for supporting communication among users. The system includes a storage device for storing, a search unit for searching, and a selection unit for reading and then selecting a communication means to be used in the communication between the first and second users. The method and computer program product for supporting communication among users includes the steps of searching, reading and then selecting a communication means to be used in the communication between the first and second users.

9 Claims, 14 Drawing Sheets

110

| AVATAR ID | LOCATION INFORMATION (x,y,z) | COMPONENT | FACING DIRECTION (u,v,w) | DIRECTION OF EYES (u,v,w) |
|---|---|---|---|---|
| 1 | (5F21, 1E3A, 00A0) | HEAD (ID=32353)<br>CLOTHES (ID=12341)<br>HANDS (ID=23212)<br>FEET (ID=64252) | (E0, 1B, 03) | (E0, 1B, 03) |
| 2 | (5F20, 1E3B, 00A0) | HEAD (ID=13212)<br>CLOTHES (ID=9321)<br>HANDS (ID=33235)<br>FEET (ID=51234) | (1A, C0, 03) | (1A, C0, 03) |
| 3 | (5F20, 1E2E, 00A0) | HEAD (ID=9563)<br>CLOTHES (ID=15232)<br>HANDS (ID=22331)<br>FEET (ID=17658) | (10, 85, 03) | (10, 85, 03) |
| ⋮ | ⋮ | ⋮ | ⋮ | ⋮ |

| USER ID:1   USER NAME:AAA   APPROVAL POINTS:1022pts ||| 
|---|---|---|
| TIME OF ACTIVITY | LOCATION OF ACTIVITY | CONTENT OF ACTIVITY |
| 11/15/ 23:01 | (5F21, 1E3A, 00A0) | TRAVELING → ARRIVAL |
| 11/15/ 23:02 | (5F21, 1E3A, 00A0) | PARTICIPATION IN COMMUNITY (ID=3021) |
| 11/15/ 03:20 | (5F21, 1E3A, 00A0) | END OF PARTICIPATION IN COMMUNITY (ID=3021) |
| 11/15/ 03:23 | (5F00, 1A25, 00A0) | TRAVELING → ARRIVAL |
| 11/15/ 03:33 | (5F00, 1A25, 00A0) | PURCHASE OF PRODUCT (ID=1220) |
| ⋮ | ⋮ | ⋮ |

| CONTENT OF ACTIVITY | TOTAL NUMBER OF TIMES | TOTAL NUMBER OF TIMES IN THE PAST MONTH |
|---|---|---|
| PARTICIPATION IN COMMUNITY (ID=3021) | 11202 | 302 |
| PURCHASE OF PRODUCT (ID=1220) | 1520 | 30 |
| ⋮ | ⋮ | ⋮ |

| AVATAR ID | COMMUNICATION MEANS | SCORE | | PRIORITY LEVEL |
| | | TRANSMISSION SCORE | RECEPTION SCORE | |
|---|---|---|---|---|
| 1 | JAPANESE (SPEECH) | 90 | 90 | 70 |
| | JAPANESE (TEXT) | 80 | 90 | 70 |
| | ENGLISH (SPEECH) | 50 | 55 | 90 |
| | ENGLISH (TEXT) | 55 | 70 | 90 |
| 2 | ARABIC (SPEECH) | 90 | 90 | 90 |
| | ARABIC (TEXT) | 90 | 90 | 90 |
| | ENGLISH (SPEECH) | 80 | 80 | 90 |
| | ENGLISH (TEXT) | 70 | 80 | 90 |
| ⋮ | ⋮ | ⋮ | ⋮ | ⋮ |

| CONVERSION MEANS | CONVERSION ACCURACY |
|---|---|
| TEXT-TO-SPEECH SYNTHESIS (JAPANESE) | 75 |
| SPEECH RECOGNITION (JAPANESE) | 65 |
| TEXT-TO-SPEECH SYNTHESIS (ENGLISH) | 80 |
| SPEECH RECOGNITION (ENGLISH) | 70 |
| TEXT-TO-SPEECH SYNTHESIS (ARABIC) | 60 |
| JAPANESE-ENGLISH TRANSLATION | 70 |
| ENGLISH-JAPANESE TRANSLATION | 70 |
| JAPANESE-ARABIC TRANSLATION | 40 |
| ENGLISH-ARABIC TRANSLATION | 50 |

| PATTERN \ PARAMETER | 1 | 2 |
|---|---|---|
| 1 |  |  |
| 2 |  |  |
| 3 |  |  |
| 4 |  |  |
| 5 |  |  |
| 6 |  |  |
| 7 |  |  |
| 8 |  |  |

SYSTEM AND METHOD FOR SUPPORTING DYNAMIC SELECTION OF COMMUNICATION MEANS AMONG USERS

CROSS-REFERENCE TO RELATED APPLICATION

This application claims priority under 35 U.S.C. §119 from Japanese Patent Application No. 2007276931 filed Oct. 24, 2007, the entire contents of which are incorporated by reference herein.

BACKGROUND OF THE INVENTION

1. Field of the Invention

The present invention relates to supporting communication among users. More particularly, the present invention relates to selecting a communication means to be used in the communication.

2. Description of the Related Art

In recent years, natural-language processing including machine translation, speech recognition and text-to-speech synthesis have been developed and have been put to practical use. Meanwhile, with the widespread use of communication networks such as the Internet, people all over the world have come to perform communication in various forms. For example, in addition to communication by use of text data such as an e-mail or a chat, communication by use of speech data through VoIP (Voice over Internet Protocol) is performed.

Refer to Japanese Patent Application Laid-open Publication No. 2001-321571 as an example of the background art related to virtual space.

Attempts to constructing a virtual world on the Internet have expanded in recent years. For example, a user operates an avatar that is a character representing the user in the world. The avatar is displayed on a screen as a three-dimensional image, for example. Avatars that are characters representing different users are also displayed on the screen. Here, a user can start communication with a different user in text or speech when the avatar of the user approaches the avatar of the different user.

However, because the appearance of an avatar is different from the appearance of a user of the avatar him/herself, it is difficult to know the nationality, residence or personality of an avatar from the appearance thereof. If a user wants to talk to an avatar, for example, it is difficult to know what language the avatar can speak. It is even more difficult to know whether or not communication with the avatar is possible by use of a machine translation technique and, if possible, what translation technique is appropriate for the communication. For this reason, the user may hesitate to start the communication in order to establish communication in some cases.

SUMMARY OF THE INVENTION

The present invention provides a system, a method and a program capable of supporting the communication among users in virtual worlds. This is achieved by a combination of features described in the independent claims in the scope of claims, and the dependent claims define more advantageous examples of the present invention.

According to one embodiment of the present invention, a system for supporting communication among users is provided. The system includes a storage device for storing each of at least one communication means used by each user, in association with a score indicating a skill level of the user in using the communication means, a search unit for searching out, from the storage device, at least one first communication means used by a first user and at least one second communication means used by a second user, wherein each communication means can be used in common by both the first and second user, and a selection unit for reading, from the storage device, the scores of the first and second users for each of the searched-out communication means, and then selecting a communication means to be used in the communication between the first and second users, on the basis of the read scores.

According to another embodiment of the present invention, a method is provided. The method includes the steps of searching out, from the storage device, at least one communication means that first and second users can use in common reading, from the storage device, the scores of the first and second users for the searched-out communication means, and then selecting a communication means to be used in the communication between the first and second users, on the basis of the read scores.

According to another embodiment of the present invention, a computer program product is provided having a computer usable program code configured to carry out instructions for causing a computer to perform the steps of searching out, from the storage device, at least one communication means that first and second users can use in common, reading, from the storage device, the scores of the first and second users for the searched-out communication means, and selecting a communication means to be used in the communication between the first and second users, on the basis of the read scores.

Note that the above summary of the invention does not include all necessary aspects of the present invention, and sub-combinations of groups of these aspects are included in the scope of the invention.

BRIEF DESCRIPTION OF THE DRAWINGS

FIG. 4 shows an example of a data structure stored in a partial 3D model DB 110 according to the embodiment.

FIG. 7 shows a concrete example of activity record stored in an all-users information DB 220 according to the embodiment.

FIG. 8 shows an example of statistical information stored in the all-users information DB 220 according to the embodiment.

FIG. 9 shows a concrete example of communication means stored in the all-users information DB 220 according to the embodiment.

DETAILED DESCRIPTION OF THE PREFERRED EMBODIMENTS

Hereinafter, the present invention will be described by use of an embodiment of the invention. However, the following embodiment does not limit the invention according to the scope of the claims, and not all of the combinations of features described in the embodiment are necessarily essential for the solving means of the invention.

Figure 1:
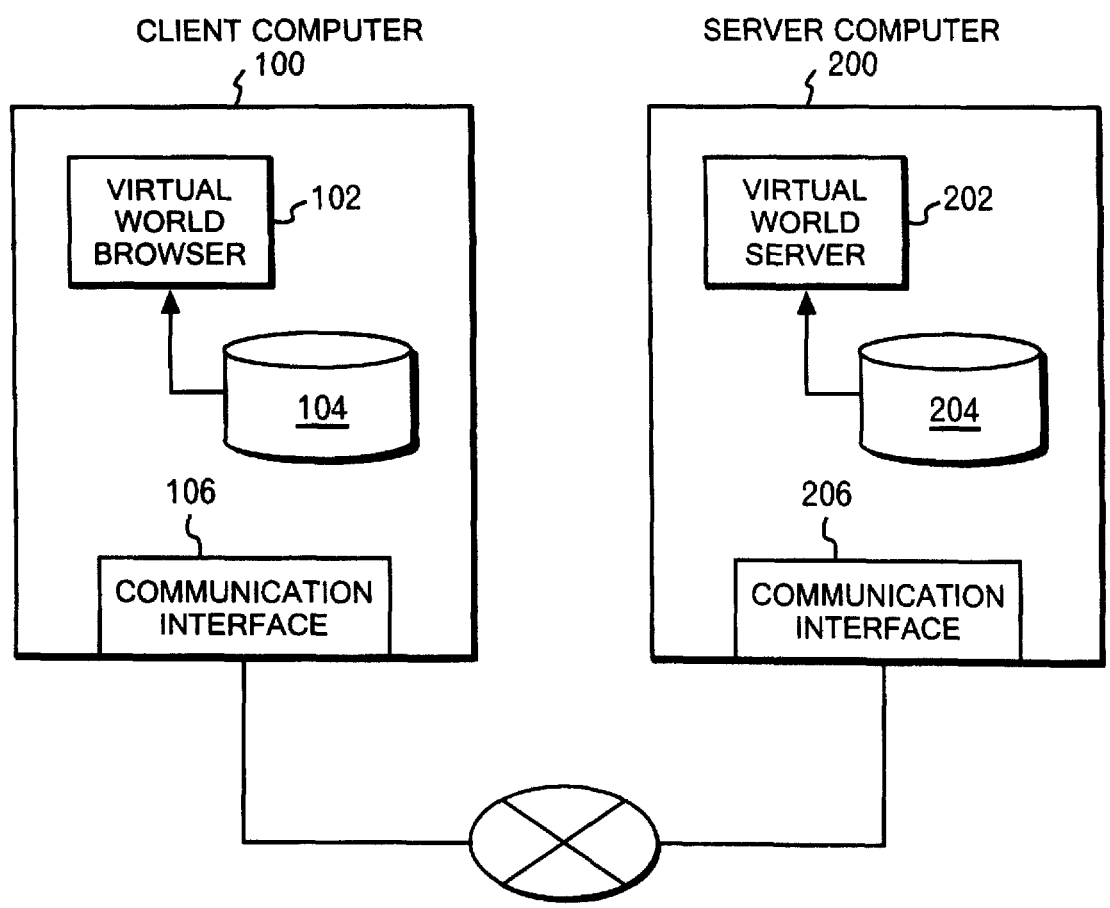
FIG. 1 shows an entire configuration of an information system 10 according to the embodiment.

FIG. 1 shows an entire configuration of an information system 10 according to the present embodiment. The information system 10 includes a client computer 100 and a server computer 200. The server computer 200 includes, as basic hardware, a storage device 204 such as a hard disk drive, and a communication interface 206 such as a network interface card. The server computer 200 functions as a virtual world server 202 by reading a program from the storage device 204 and causing a CPU to execute the program. The virtual world server 202 provides, to the client computer 100, data indicating three-dimensional shapes of various objects contained in the virtual world. More specifically, the objects include, for example, an avatar that is a character representing the user, clothes worn by the avatar, virtual buildings and backgrounds.

The client computer 100 includes, as basic hardware, a storage device 104 such as a hard disk drive, and a communication interface 106 such as a network interface card. The client computer 100 functions as a virtual world browser 102 by reading a program from the storage device 104 and causing a CPU to execute the program. The virtual world browser 102 renders the data of three-dimensional shapes obtained from the server computer 200 through the communication line into two-dimensional images, and displays the images to a user. The virtual world browser 102 also communicates with the server computer 200 and updates the data of three-dimensional shapes stored in the server computer 200, in response to an input from a user.

The information system 10 of the embodiment aims to provide various schemes for supporting communication between users in a system implementing such a virtual world. Hereinafter, specific descriptions will be provided.

Figure 2:
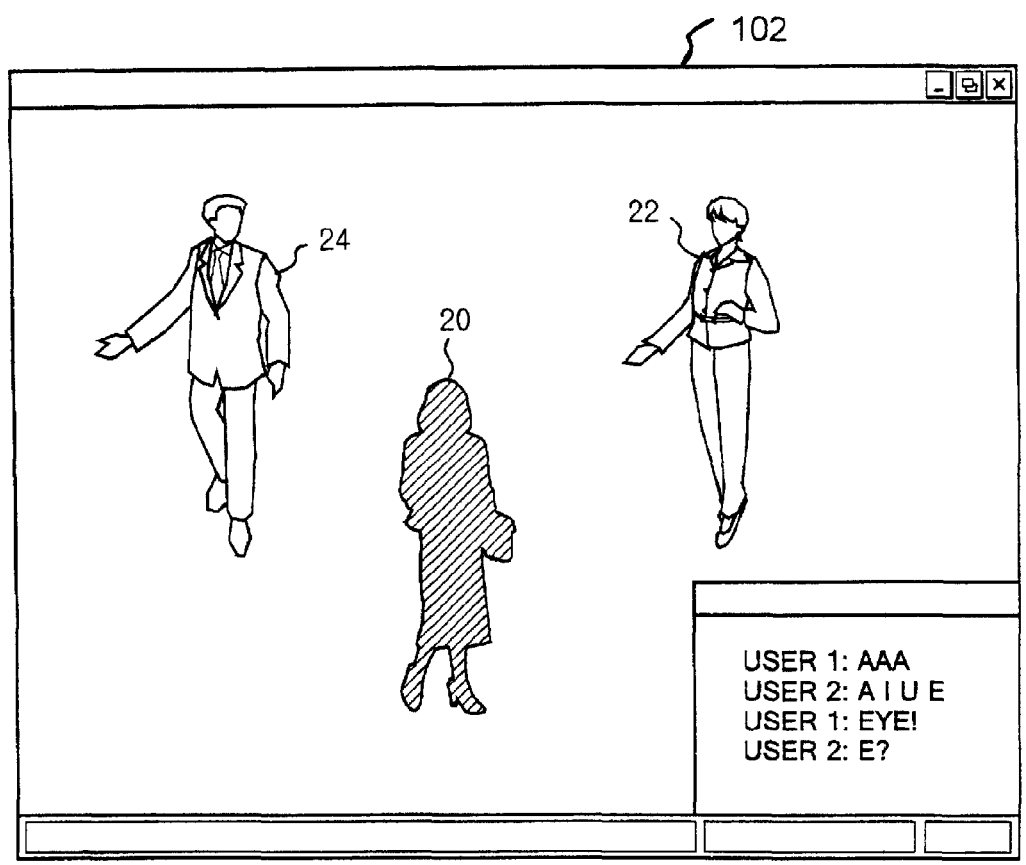
FIG. 2 shows an example of a screen displayed by a virtual world browser 102 according to the embodiment.

FIG. 2 shows an example of a screen displayed by the virtual world browser 102 according to the embodiment. The virtual world browser 102 displays to a user an image as viewed through the eyes of an avatar serving as a character representing the user in the virtual world. In this screen, the avatar is one example of a displayed object and is displayed as an image in the shape of a human body. An avatar 20 in the near side of the screen represents an avatar operated by the user of the client computer 100.

Meanwhile, each of the avatars 22 and 24 in the far side of the screen is assigned to a different user and represents an avatar operated by the different user. Thus, an avatar is displayed on the screen as a two-dimensional image rendered from the data of its three-dimensional shape. When the avatar moves according to an operation by the user, the three-dimensional shape also changes, whereby the two-dimensional image changes. As a result, a change also occurs in the screen displayed by the virtual world browser 102. In addition, text data used in the communication may be displayed on a sub window in a lower right part of the screen, for example.

Figure 3:
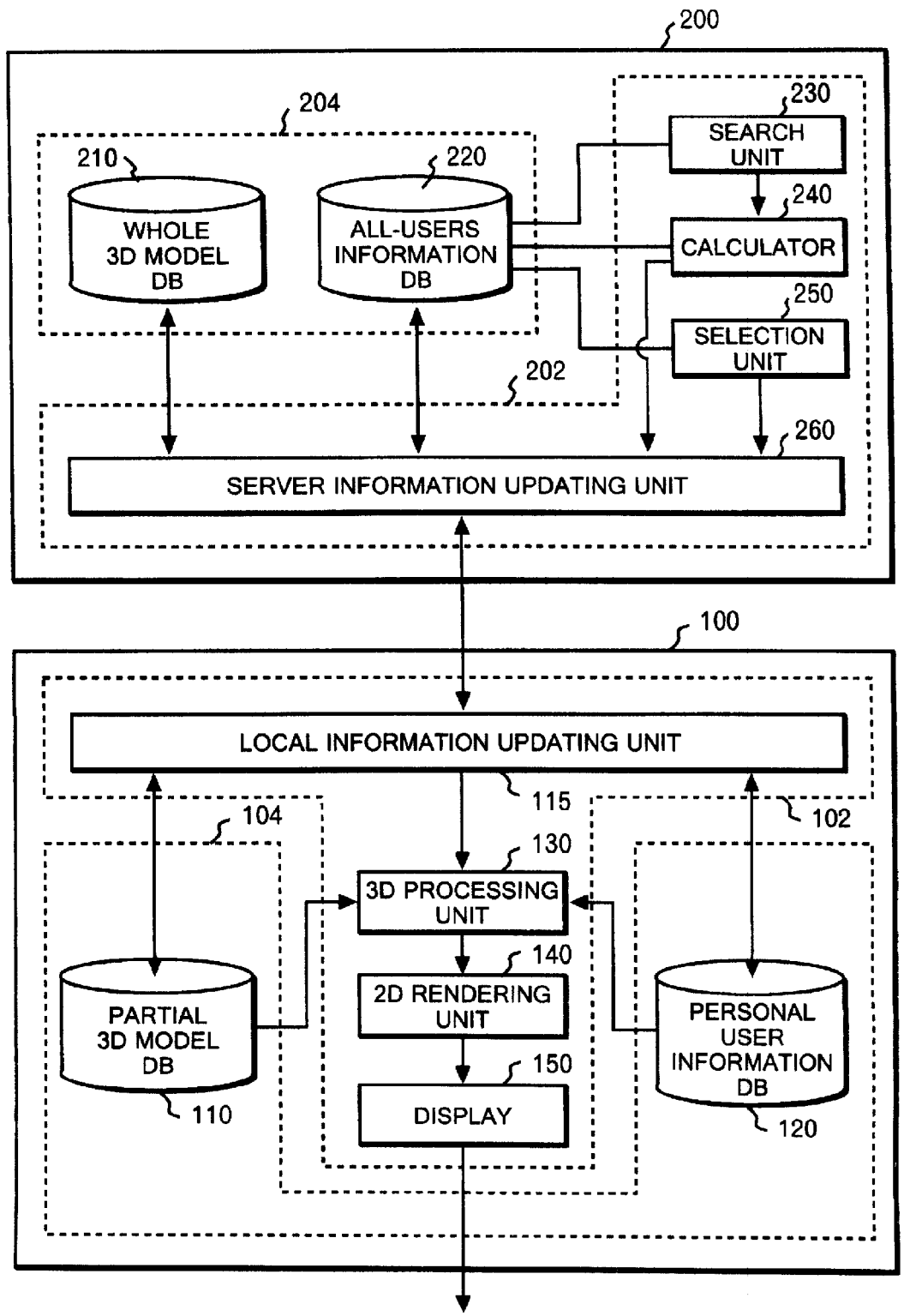
FIG. 3 shows functional configurations of a client computer 100 and a server computer 200 according to the embodiment.

FIG. 3 shows a block diagram of the client computer 100 and the server computer 200 according to the embodiment. The server computer 200 includes a whole 3D model DB 210, an all-users information DB 220, a search unit 230, a calculator 240, a selection unit 250 and a server information updating unit 260. The whole 3D model DB 210 and the all-users information DB 220 are implemented by the storage device 204. The search unit 230, the calculator 240, the selection unit 250 and the server information updating unit 260 are implemented by the virtual world server 202.

The whole 3D model DB 210 contains data of a three-dimensional shape of each of the objects in the virtual world. The all-users information DB 220 contains attributes of each of the avatars in the virtual world. Attributes of an avatar may be attributes of the user him/herself operating the avatar, or may be attributes that the user virtually sets for the avatar.

A certain attribute of a user may, for example, indicate at least one communication means that the user employs. In this case, the all-users information DB 220 may further contain, as an attribute, a score indicating the skill level of the user in using the communication means.

The search unit 230 searches the all-users information DB 220 to find at least one communication means that can be commonly used by a first user and a second user. Thereafter, the calculator 240 reads, from the all-users information DB 220, the scores of the first and second users for each of the searched-out communication means.

Subsequently, the calculator 240 calculates the intensity of a relationship between the first and second avatars, from the scores read for each searched-out communication mean. For example, if the product of the read scores is larger than a reference value, the relationship is strong as compared to when the product is smaller than the reference value. The calculated intensity of the relationship is stored in the all-users information DB 220.

The selection unit 250 reads, from the all-users information DB 220, the scores of the first and second users for each of the communication means searched-out by the search unit 230. According to the read scores, the selection unit 250 selects a communication means by which the first and second users should communicate. For example, a communication means having the highest product of scores of the first and second users is selected. The selected communication means is stored in the all-users information DB 220.

When the whole 3D model DB 210 and the all-users information DB 220 are updated, the server information updating unit 260 transmits the difference caused by the update to the client computer 100. Moreover, upon receipt of the difference caused by an update in a partial 3D model DB 110 or a personal user information DB 120, the server information updating unit 260 updates the whole 3D model DB 210 and the all-users information DB 220 with this difference. Hence, changes in an avatar according to operations by a user are sequentially reflected to both the whole 3D model DB 210 and the all-users information DB 220. Meanwhile, if the avatar is changed according to operations by another user, the change is sequentially reflected to both the partial 3D model DB 110 and the personal user information DB 120.

The client computer 100 includes a partial 3D model DB 110, a local information updating unit 115, a personal user information DB 120, a 3D processing unit 130, a 2D rendering unit 140 and a display device 150. The partial 3D model DB 110 obtains parts of the whole 3D model DB 210 from the server computer 200 and stores the data therein. The stored parts include, for example, the view within the visible range of an avatar corresponding to the user of the client computer 100. That is, every time the visible range (such as the direction of the eyes or the width of the visible range) of the avatar is changed, for example, the local information updating unit 115 obtains necessary parts of the whole 3D model DB 210 by sending a request to the server computer 200. Then the local information updating unit 115 stores the obtained data in the partial 3D model DB 110.

The personal user information DB 120 stores attributes of the user of the client computer 100. When any of the attributes are updated, the local information updating unit 115 transmits the difference caused by the update to the server computer 200. This difference is used to update the all-users information DB 220 in the server computer 200.

The 3D processing unit 130 is activated when the avatar operated by the user of the client computer 100 changes its direction or when an object within the visible range of the avatar changes, for example. Alternatively, the 3D processing unit 130 may operate periodically. The 3D processing unit 130 processes data stored in the partial 3D model DB 110 according to the intensity of a relationship obtained from the server computer 200. In a case where an avatar of a different user is included in the visible range of the avatar of the user of the client computer 100, for example, a three-dimensional shape of the avatar of the different user is stored in the partial 3D model DB 110.

Then, the 3D processing unit 130 reads, from the whole user information DB 220, an index value indicating the intensity of the relationship between the avatar of the user of the client computer 100 and the different avatar, through the local information updating unit 115. If the intensity of the relationship indicated by the read index value is higher than a reference, the 3D processing unit 130 changes the three-dimensional shape of the different avatar so that the relationship is distinguishable. Further, the 3D processing unit 130 may change the color of the different avatar or change the action of the different avatar. This change is reflected only locally to the partial 3D model DB 110 and is not reflected to the whole 3D model DB 210.

The 2D rendering unit 140 then generates a two-dimensional image on the basis of the data read from the partial 3D model DB 110 and then processed by the 3D processing unit 130. Here, the 2D rendering unit 140 generates the two-dimensional image by rendering each of the objects within the visible range of the avatar from the viewpoint of the avatar of the user of the client computer 100. For example, if a different avatar is included within the visible range of the avatar of the user of the client computer 100, the 2D rendering unit 140 generates a two-dimensional image of the different avatar so that the intensity of the relationship to the avatar of the user of the client computer 100 is distinguishable. Specifically, a change is made in the shape, action or color of the different avatar. The generated image is displayed on the display device 150.

FIG. 4 shows an example of a data structure stored in the partial 3D model DB 110 according to the embodiment. The partial 3D model DB 110 stores data of three-dimensional shapes of the necessary parts of the virtual world to be displayed on the display device 150. The partial 3D model DB 110 stores therein, for example, information on the displayed objects within the visible range of the avatar of the user of the client computer 100, among objects in the virtual world.

A displayed object is, for example, an avatar of a different user. The partial 3D model DB 110 stores, in association with each of the avatars of the different users, an ID of the avatar, a location of the avatar in the virtual world, components included in the avatar, a direction that the avatar is facing, and a direction of the eyes of the avatar.

Specifically, the location of an avatar with an ID of 1 in the virtual world is defined by a coordinate (5F21, 1E3A, 00A0). Although the position coordinate here is expressed with a three-dimensional coordinate represented in hexadecimal, the specific data structure for showing the coordinate is not limited to this.

Additionally, this avatar includes a head, clothes, hands and feet as components thereof. For example, the head component is given an identifier 32353. Data indicating further details such as a three-dimensional shape of this component may be stored in the partial 3D model DB 110, in the whole 3D model DB 210 or in another database. By the 2D rendering unit 140, this data may also be read and rendered as a two-dimensional image.

A normal vector of the direction that the avatar is facing is (E0, 1B, 03), and a normal vector of the direction of the eyes of the avatar is (E0, 1B, 03). Although the direction that the avatar is facing and the direction of the eyes of the avatar are each expressed with a three-dimensional coordinate represented in hexadecimal, the specific data structure for showing the directions is not limited to this.

In addition, the partial 3D model DB 110 may store data of three-dimensional shapes of objects related to the environment such as land and sky, as long as the objects are within the vision range of the avatar. The partial 3D model DB 110 may also store data of three-dimensional shapes of other various objects included in the virtual world.

Figure 5:
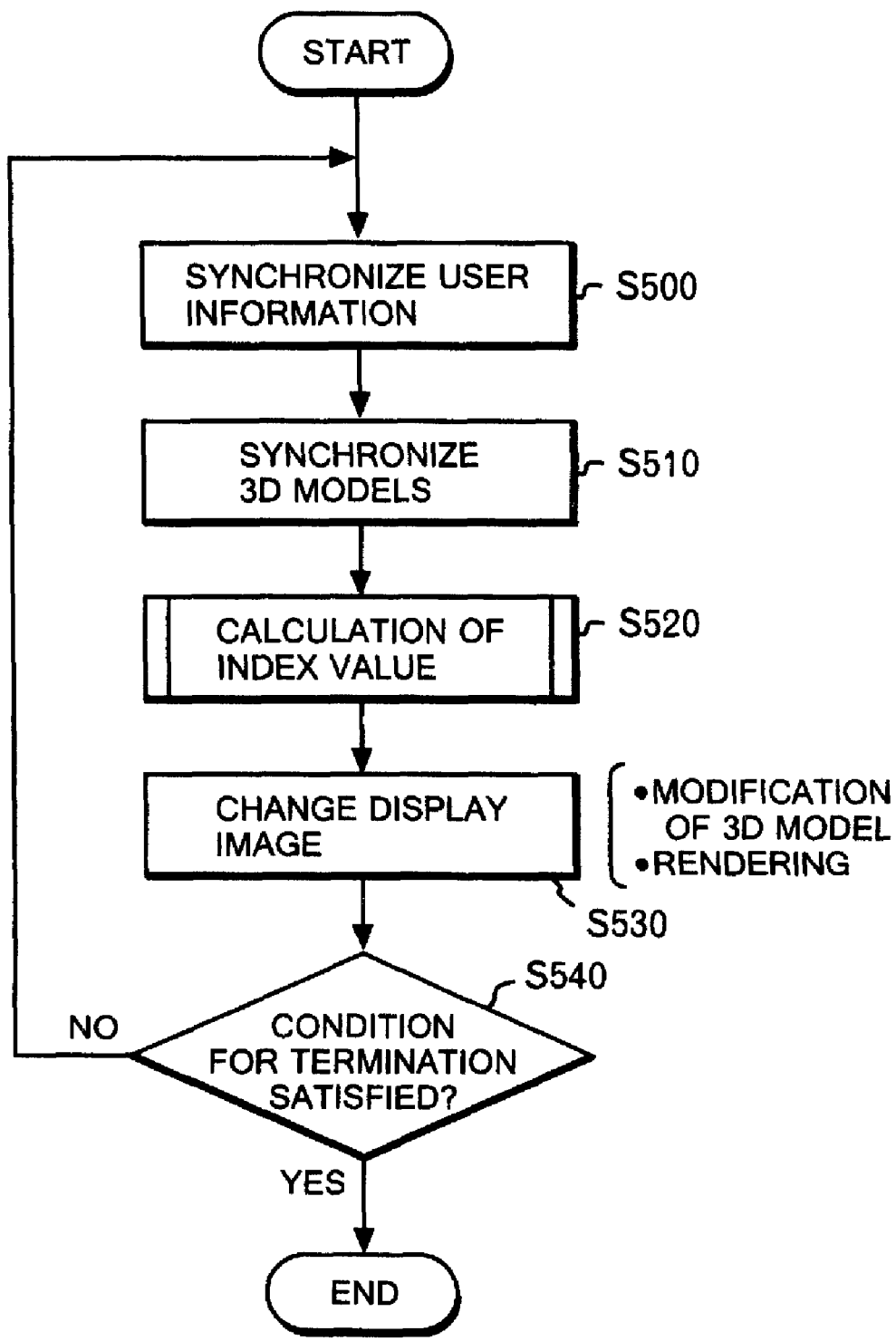
FIG. 5 shows a flowchart of processing in which the information system 10 according to the embodiment sequentially changes the display thereof.

FIG. 5 shows a flowchart of processing in which the information system 10 according to the embodiment sequentially changes the display thereof. Every time any user participating in the virtual world operates his/her avatar, or periodically at a predetermined frequency, the local information updating unit 115 and the server information updating unit 260 operate as follows.

First, the local information updating unit 115 and the server information updating unit 260 synchronize user information (attributes such as an activity record) between the client computer 100 and the server computer 200 (S500). For example, when a change is made in the personal user information DB 120, the local information updating unit 115 notifies the server information updating unit 260 of the difference caused by the update. In response, the server information updating unit 260 updates the all-users information DB 220 with the notified difference.

Then, the local information updating unit 115 and the server information updating unit 260 synchronize the 3D model between the client computer 100 and the server computer 200 (S510). For example, assume a case where a change is made in any of the attributes of the avatar of the user of the client computer 100 by his/her operation. The attributes include, for example, the direction the avatar is facing, the shape of the avatar. In this case, the local information updating unit 115 notifies the server information updating unit 260 of the difference caused by the change.

In response to this notification, the server information updating unit 260 updates the whole 3D model DB 210 with the difference caused by the change. The server information updating unit 260 also notifies different client computers of this difference caused by the change, according to need. Consequently, a change is also made in each of the different client computers. More specifically, a change is made in an image showing the visible range of each avatar corresponding to the different computers, including the avatar of the user of the client computer 100.

Moreover, assume a case where a change is made in the visible range of the avatar of the user of the client computer 100 in response to the notification of the change in the attributes of the avatar. In this case, the server information updating unit 260 reads, from the whole 3D model DB 210, data of a three-dimensional shape of the object newly included in the visible range of the avatar. The server information updating unit 260 in return transmits the read data to the local information updating unit 115. The local information updating unit 115 updates the partial 3D model DB 110 with the received data.

Upon completion of the synchronization as described above, the virtual world server 202 calculates an index value indicating the intensity of a relationship between each pair of avatars on the basis of the modified data (S520). A concrete example of a determination made by the virtual world server 202 will be described with reference to FIGS. 6 to 12. Specifically, in the example, the virtual world server 202 determines the intensity of a relationship between a first avatar of a first user and a second avatar of a second user.

Figure 6:
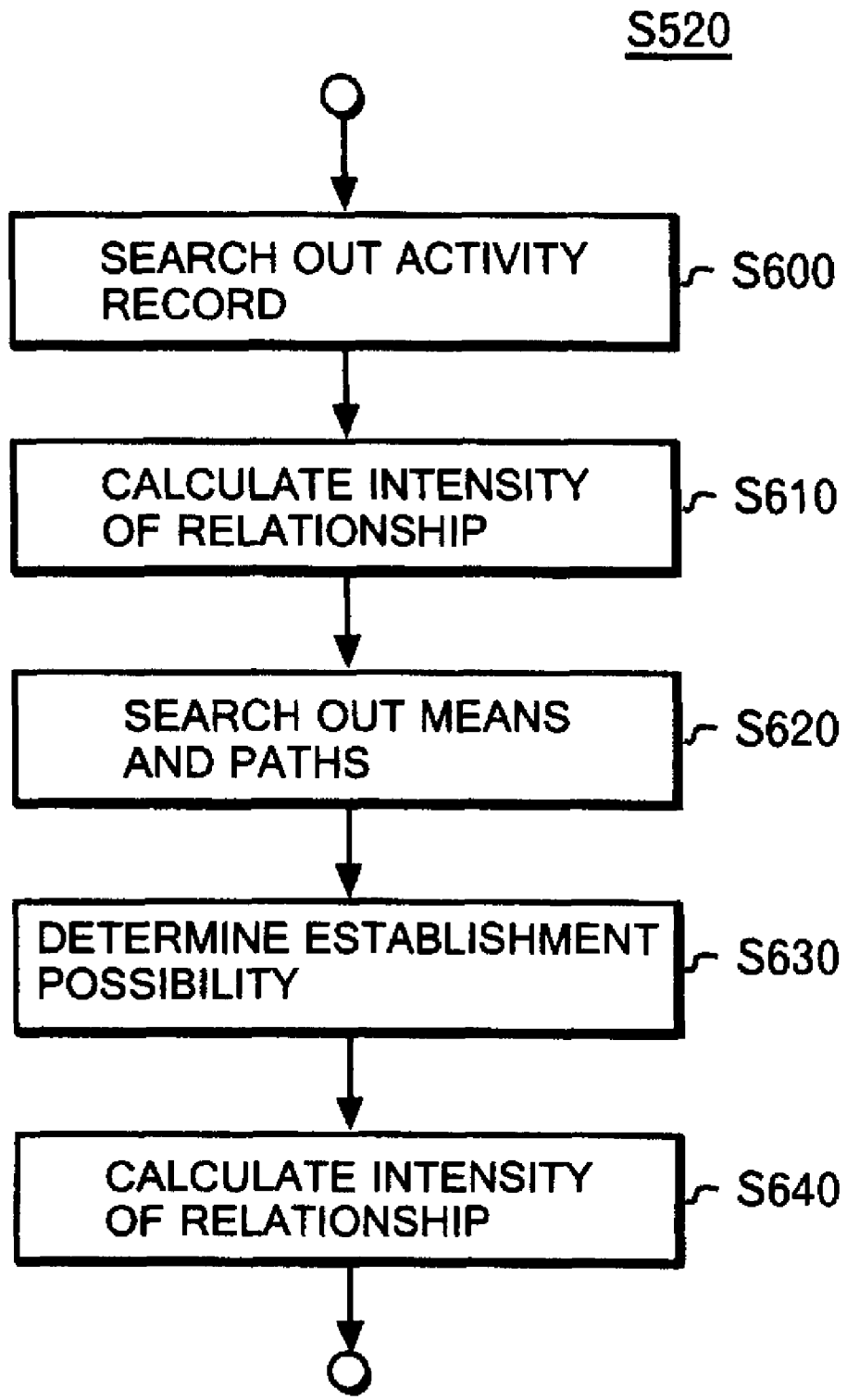
FIG. 6 shows details of the processing in S520.

FIG. 6 shows details of the processing in S520. Firstly, the search unit 230 searches out an activity record of each of the first avatar of the first user and the second avatar of the second user from the all-users information DB 220. An example of the activity record is shown in FIG. 7.

FIG. 7 shows a concrete example of the activity record stored in the all-users information DB 220 according to the embodiment. The all-users information DB 220 stores an activity record of the avatar of every user as one example of attributes of the user or the avatar.

The all-users information DB 220 stores an activity record of every user together with basic information such as a user ID and a user name. An activity record shows time of activity, a location of activity and content of activity. Time of activity is expressed in clock time, for example. Alternatively or additionally, time of activity may indicate a time width such as from what time until what time, or a time zone such as nighttime, daytime or morning.

A location of activity is expressed as a coordinate indicating a position in the virtual world, for example. Alternatively or additionally, a location of activity may be a name of a community in the virtual world, or a name of a real estate (such as an exhibition hall, an art museum, an amusement park, a museum, a department store or a home owned by an avatar) in the virtual world.

Content of activity indicates an action of an avatar such as traveling and arriving, participation in a community, or purchase of a product. Alternatively or additionally, content of activity may indicate: content of a comment as a result of an activity of making a comment; or that the user logs in or logs out of the virtual world itself or a certain community included therein.

Moreover, the all-users information DB 220 stores approval points given to each user. Approval points indicate a value of accumulated points given to a user when the avatar of the user performs a predetermined activity.

A predetermined activity mentioned here refers to, for example, a good activity such as one in which a certain first avatar provides useful information to a certain second avatar. In this case, additional approval points are given to the first avatar if the second avatar wishes.

On the other hand, a predetermined activity may also refer to, for example, a bad activity such as one in which a first avatar breaks a promise with a second avatar. In this case, approval points are taken away from the first avatar if the second avatar wishes.

The approval points may alternatively be given by an administrator of the virtual world or of a certain community, as a result of an accessibility or an open community activity. Moreover, in order to prevent unfair use of the approval points, an upper limit may be set in advance for the number of points that can be added or taken away with a single activity.

The above-mentioned activity records for all of the users are compiled and stored in the all-users information DB 220. An example of the compiled activity records is shown in FIG. 8.

FIG. 8 shows an example of statistical information stored in the all-users information DB 220 according to the embodiment. The all-users information DB 220 stores statistical information into which activity records of all of the avatars in the virtual world are compiled. For example, the all-users information DB 220 stores the total number of times that each activity has been performed by at least one avatar in the virtual world. Further, the all-users information DB 220 may store the total number of times each activity has been performed in the preceding month.

In place of the number of times of activity, the all-users information DB 220 may store the frequency of activity, that is, a value obtained by dividing the number of times of activity by an observation period thereof. Additionally or alternatively, the all-users information DB 220 may store the total number of times of each activity performed by only users that belong to a certain community in the virtual world, and not by all of the users in the virtual world.

The description goes back to FIG. 6. Next, the calculator 240 calculates an index value indicating the intensity of the relationship between the first avatar and the second avatar, in reference to the searched-out activity record (S610). Hereinafter, a description will be given for a concrete example of the calculation method.

First, the probability that activity X is performed is set as P (X). In addition, the first avatar is set as avatar A, and the second avatar is set as avatar B. Then, the probability that certain avatar A performs activity X is expressed as P (X|A). Here, when activity X is observed, the probability that the activity is performed by avatar A is calculated by use of the following Equation (1).

$$P(A \mid X) = \frac{P(X \mid A)}{P(X)} P(A) \qquad \text{Equation (1)}$$

Meanwhile, the probability of an avatar that a user comes across while browsing the virtual world being avatar A is set as a prior probability P (A). Then, a posterior probability P (A|X) obtained by multiplying the prior probability P (A) by a weight representing one observation of X indicates the intensity of the relationship between activity X and avatar A.

For example, if every avatar performs activity X at an equal probability, P (X|A)=P (X) is true. Accordingly, the posterior probability P (X|A) on the left side is equal to the prior probability P (A) (activity X does not include information differentiating the avatars). If avatar A seldom performs activity X, P (X|A) is virtually 0, and thus the value obtained by Equation (1) is virtually 0.

If avatar A nearly always performs activity X, the value of P (X|A) is virtually 1. Here, P (X)=P (A) is also true, and thus the value obtained by Equation (1) is virtually 1. By setting each avatar included in the virtual world as avatar a, the probability that activity X is performed is expressed by the following Equation (2).

$$P(X) = \sum_a P(X \mid a) P(a) \qquad \text{Equation (2)}$$

A likelihood P (X|a) is determined by observation. Although a prior probability P (a) may also be determined by observation, the inverse of the total number of avatars included in the virtual world may approximately be set as the prior probability P (a). In the embodiment, the total number of times for each activity stored in the all-users information DB, explained with reference to FIG. 8, may be used as the probability P (X) for each activity X.

Assume that vector $V_A$ is an attribute of avatar A, the vector $V_A$ including posterior probabilities P (A|X), P (A|Y), respectively corresponding to activities X and Y, as elements thereof. Here, the mutuality between activity records of avatar A and avatar B is expressed by the following Equation (3).

$$M_{AB} = V_A \cdot V_B \qquad \text{Equation (3)}$$

Here, a center dot in the equation indicates the inner product of the vectors.

In a case where the activity records of avatar A and avatar B include a larger number of common activity records, $M_{AB}$ in Equation (3) becomes larger than in a case where the activity records include a smaller number of common activity records. Accordingly, the calculator 240 may calculate $M_{AB}$ in Equation (3) as the index value, so that the index value indicates the intensity of the relationship between the first and second avatars.

In addition, the denominator of the fraction on the right side of Equation (1) is P (X). Accordingly, each element of a vector used in calculating the right side of Equation (3) decreases with an increase of the frequency of the activity indicated by the element. As a result, the vector makes a smaller contribution to the value of the inner product. Hence, the index value takes a larger value when the common activity record of the first and second avatars includes an activity that is less frequently performed by the other avatars, than when the common activity record includes an activity that is more frequently performed by other avatars. The calculator 240 can evaluate that the relationship between first and second avatars is stronger as the frequency of an activity commonly included in the activity records of the first and second avatars is lower.

As another example, the calculator 240 may calculate the index value indicating the intensity of the relationship between the first and second avatars according to approval points given to the avatars. For example, assume a case where the difference between the approval points of the first and second avatars is smaller. In this case, the calculator 240 may calculate an index value indicating a more intense relationship than a case where the difference between the points is larger. By using these index values, a pair of avatars having a similar moral sense and having similar degrees of activeness in the virtual world can be determined to be in a more intense relationship.

As yet another example, assume a case where the all-users information DB 220 stores, as attributes of each avatar, items concerning matters in which the avatar or its user is interested. In this case, the calculator 240 may calculate an index value indicating the intensity of the relationship on the basis of the mutuality between such items of the first and second avatars. Specific methods for calculating the index value may vary depending on the design of the virtual world, or a plurality of the above-mentioned methods may be combined for use.

The description goes back to FIG. 6. Next, the search unit 230 searches out, from the all-users information DB 220, at least one communication means that the first and second users can use in common. Note that in many cases, a fact that avatars communicate with each other in the virtual world virtually means that the users corresponding to the avatars communicate with each other. For this reason, the term "user" will be used instead of the term "avatar" in the following description.

FIG. 9 shows a concrete example of communication means stored in the all-users information DB 220 according to the embodiment. The all-users information DB 220 stores, for every user, an ID for the avatar of the user. The all-users information DB 220 also stores, for every user, each of the at least one communication means that the user uses, in association with a score. This score indicates the skill level of the user in using the communication means.

A score may include the following two kinds. For example, the all-users information DB 220 stores a transmission score and a reception score for every user. Specifically, the transmission score indicates a skill level of a user in using each of the communication means for transmitting information, and the reception score indicates a skill level of a user in using each of the communication means for receiving information.

For example, the user of the avatar with an ID of 1 scores a level of 90% out of 100% in the skill of transmitting information by use of Japanese speech. This skill is, in other words, the skill of the user in speaking Japanese.

Moreover, the user scores a level of 80% in the skill of transmitting information by use of Japanese text. This skill is, in other words, the skill of the user in writing Japanese sentences. Thus, the communication means may indicate the type of data to be transmitted/received, such as whether the data is text data or speech data. In addition, the communication means may indicate whether or not the user can communicate by use of sign language.

Furthermore, the user scores a level of 50% in the skill of transmitting information by use of English speech. This skill is, in other words, the skill of the user in speaking English. Thus, the communication means may indicate different languages to be used in communication.

Note that a score indicating a skill level of a user in the above example takes a percentage value between 0% and 100%. Alternatively, the score may be any numeric with no particular upper limitation. Further, the score may be self-reported and registered to the all-users information DB 220 by a user, or may indicate a result of a test taken by a user for evaluation of his/her language skill.

Alternatively, the all-users information DB 220 may store, for every user, the priority level of preferentially using each communication means in association with the communication means. For example, the all-users information DB 220 may change a priority level stored therein according to a user instruction. In this way, a user is allowed to reflect circumstances or preference of the user to an evaluation of the intensity of a relationship.

The search unit 230 searches out at least one communication means that the first and second users can commonly use, from the all-users information DB 220 having the above-mentioned data structure. In the example in FIG. 9, English speech and English text are the communication means that the avatars with IDs of 1 and 2 can commonly use, for example. Accordingly, English speech and English text are searched-out by the search unit 230 as a communication means.

Meanwhile, communication in the virtual world is sometimes made by use of a predetermined conversion system such as machine translation. In case of such communication, the all-users information DB 220 stores information on conversion means included in the virtual world. One example is shown in FIG. 10.

Figures 10, 13:
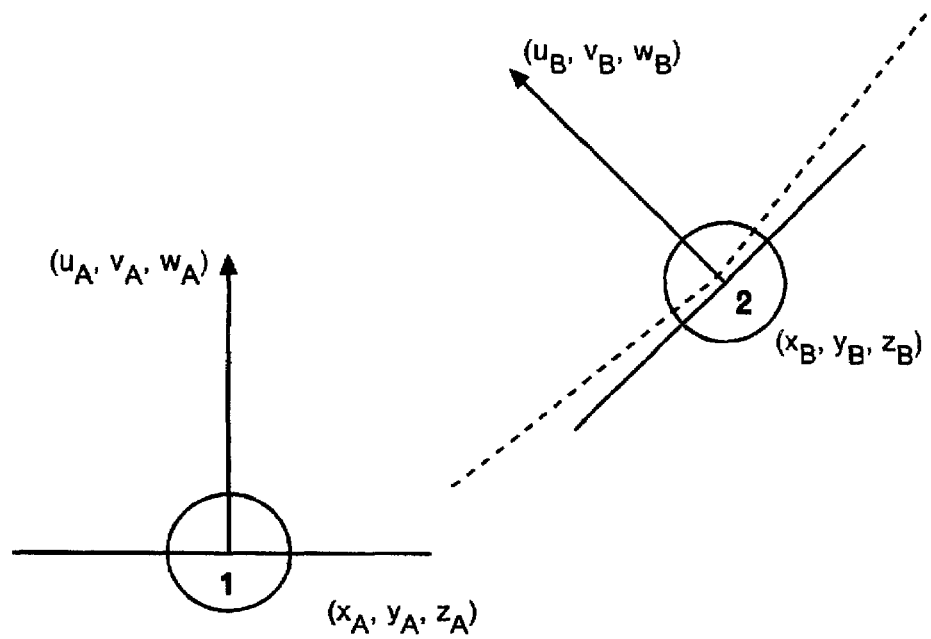
FIG. 10 shows an example of conversion means stored in the all-users information DB 220 according to the embodiment.
FIG. 13 shows a relationship between the directions that avatars 1 and 2 are facing.

FIG. 10 shows an example of conversion means stored in the all-users information DB 220 according to the embodiment. The all-users information DB 220 stores conversion accuracy by use of each of the conversion means for converting one communication means into another communication means.

For example, text-to-speech synthesis (Japanese) indicates a text-to-speech synthesis system prepared in advance in the virtual world. Specifically, the system indicates a conversion means for converting Japanese text into Japanese speech, and the conversion accuracy is 75%.

Speech recognition (Japanese) indicates a speech recognition system prepared in advance in the virtual world. Specifically, the system indicates a conversion means for converting Japanese speech into Japanese text, and the conversion accuracy is 65%.

Japanese-English translation indicates a machine translation system prepared in advance for machine translating Japanese text into English text. The conversion accuracy thereof is 70%.

The search unit 230 searches out not only communication means but also conversion means from the all-users information DB 220. Concrete examples of the searching-out process are shown in FIGS. 11 and 12.

Figure 11:
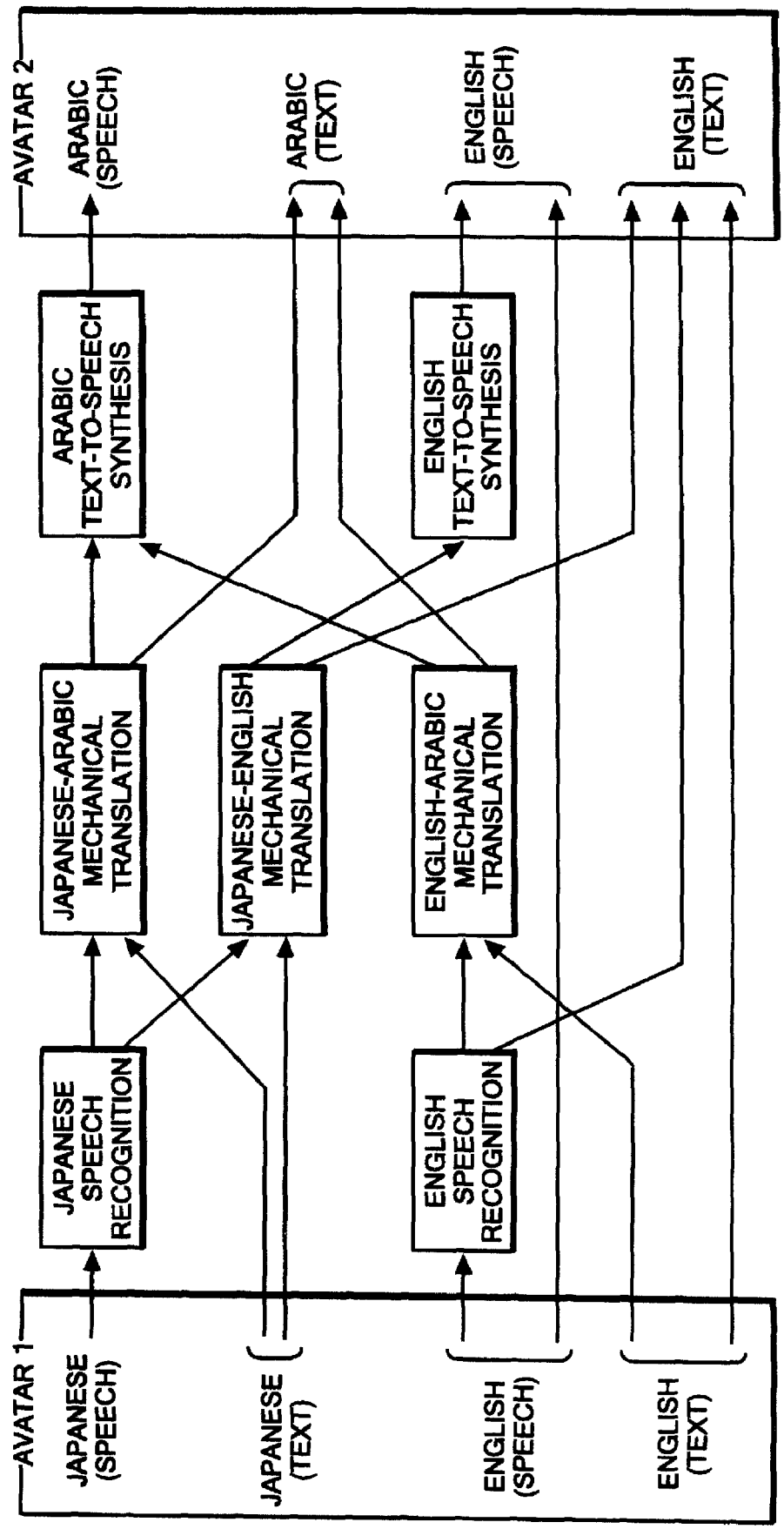
FIG. 11 shows paths of data conversion in a case where avatar 1 transmits information to avatar 2.
Figure 12:
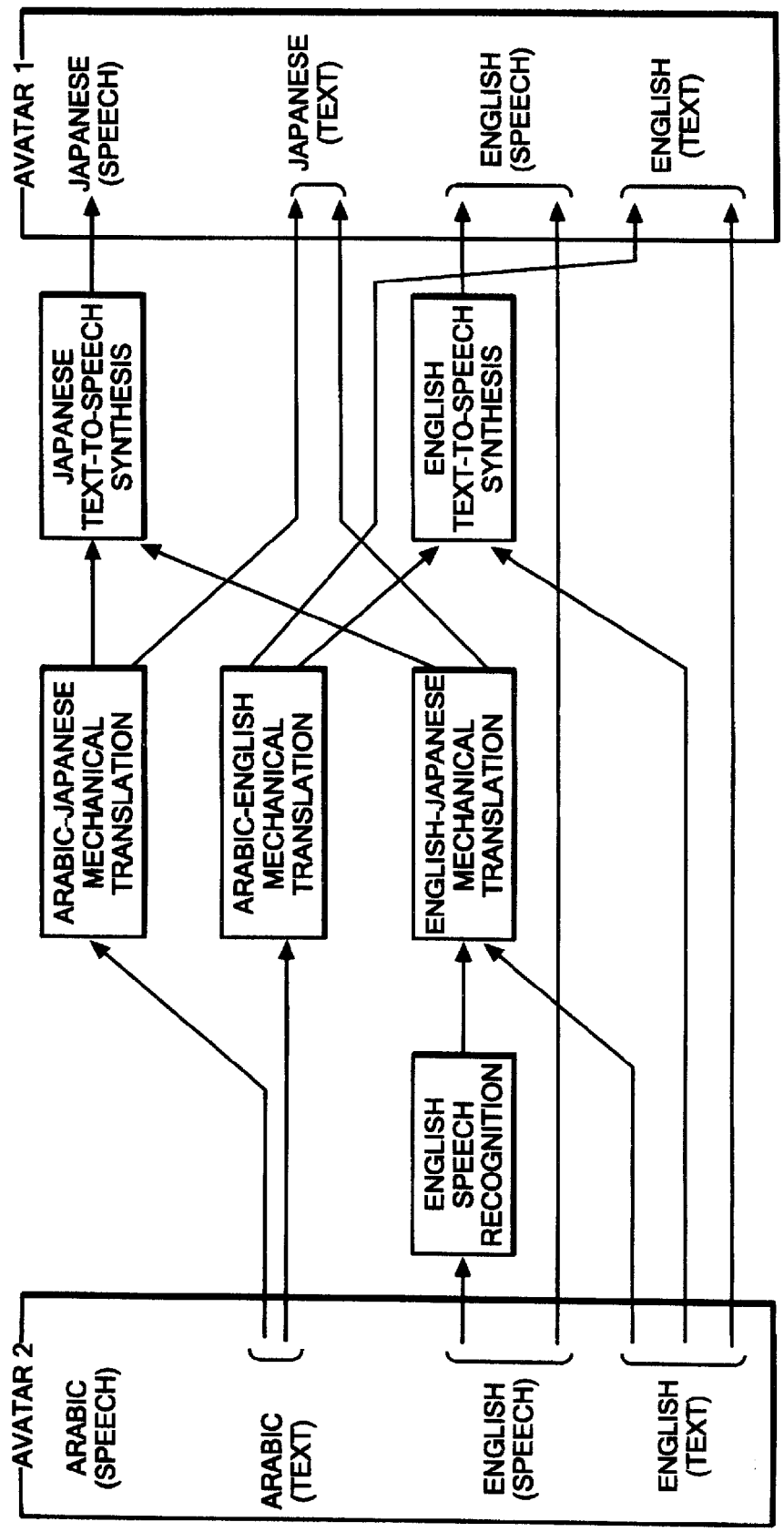
FIG. 12 shows paths of data conversion in a case where avatar 2 transmits information to avatar 1.

FIG. 11 shows paths of data conversion in a case where avatar 1 transmits information to avatar 2. In this example, the first user uses first communication means, and the second user uses second communication means. First, the search unit 230 searches out any of the first communication means that can be matched with any of the second communication means through the conversion using any of conversion means (including a case of sequentially using multiple conversion means).

In the example in FIG. 11, one of the first communication means "Japanese speech" is converted into one of the second communication means "English text" by sequentially using Japanese speech recognition and Japanese-English machine translation. In addition, in this example, every one of the first communication means is converted into any of the second communication means by use of any of the conversion means. For this reason, the search unit 230 results in searching out all of the first communication means used by the first user.

Second, the search unit 230 searches out a plurality of conversion paths each allowing at least one conversion means to convert each first communication means used by the first user, into any of the second communication means used by the second user. One example is a path through which "Japanese speech" is converted into "English text" by use of Japanese speech recognition and Japanese-English machine translation. Another example is a path through which "English speech" is converted into "English text" by use of English speech recognition.

Referring to FIG. 6 again, the calculator 240 determines the communication establishment possibility between the first and second users on the basis of each of the searched-out paths. More specifically, the calculator 240 reads, with respect to each of the searched-out conversion paths, the following data from the all-users information DB 220. The data to be read are: a score corresponding to the first communication means before conversion, conversion accuracy of each of the conversion means on the conversion path, and a score corresponding to the second communication means after conversion.

The calculator 240 then calculates, for each of the conversion paths, a product of the score corresponding to the first communication means before conversion, the conversion accuracy of each of the conversion means on the conversion path, and the score corresponding to the second communication means after conversion. The thus-calculated product of the scores indicates the communication establishment possibility. Note that the communication establishment possibility is not necessarily calculated as the product of scores and conversion accuracy, and other methods may be employed as long as the possibility is obtained on the basis of the scores and the conversion accuracy.

Referring to FIG. 11 as a concrete example, assume a path through which "Japanese speech" is converted into "English text" by use of Japanese speech recognition and Japanese-English machine translation. As the communication establishment possibility using this path, calculated is a product of: 90% that is the transmission score of Japanese speech of the first user, 65% that is the accuracy of Japanese speech recognition, 70% that is the accuracy of Japanese-English machine translation, and 80% that is the reception score of English text of the second user. The value of the product is 32.7%, for example.

As another example, similarly referring to FIG. 11, assume a path through which "English speech" is converted into "English text" by use of English speech recognition. As the communication establishment possibility using this path, calculated is a product of: 50% that is the transmission score of English speech of the first user, 70% that is the accuracy of English speech recognition, and 70% that is the reception score of English text of the second user. The value of the product is 24.5%, for example.

Then, the calculator 240 selects a path having the highest calculated communication establishment possibility. The calculator 240 also selects communication means at the ends of the selected path as the communication means to be used in the communication between the first and second users.

In addition, the calculator 240 calculates an index value indicating the intensity of the relationship between the first and second users on the basis of the selected path (S640). For example, a communication establishment possibility itself may be calculated as an index value indicating the intensity of the relationship between the first and second users. In this case, the possibility is calculated for a path having the highest communication establishment possibility.

Alternatively, bidirectional communication may be taken into consideration for the intensity of a relationship. The bidirectional communication includes not only transmission of information from the first user to the second user, but also transmission of information from the second user to the first user. One example will be described with reference to FIG. 12.

FIG. 12 shows paths of data conversion in a case where avatar 2 transmits information to avatar 1. In this example, the first user uses first communication means and the second user uses second communication means. As opposed to the example in FIG. 11, the search unit 230 first searches out any of the second communication means that can be matched with any one of the first communication means through the conversion using any of conversion means (including a case of sequentially using multiple conversion means).

In the example in FIG. 12, one of the second communication means "English text" is converted into one of the first communication means "Japanese text" by use of English- Japanese machine translation. Moreover, in this example, every one of the second communication means except for Arabic speech is converted into any of the first communication means by use of any of the conversion means. Accordingly, the search unit 230 results in searching out Arabic text, English speech and English text used by the second user.

Second, the search unit 230 searches out a plurality of conversion paths through each of which each second communication means used by the second user is converted into any of the first communication means used by the first user, with the use of at least one conversion means. One example is a path through which "English text" is converted into "Japanese text" by use of English-Japanese machine translation. Another example is a path through which "English speech" is converted into "Japanese text" by sequentially using English speech recognition and English-Japanese machine translation.

Next, the calculator 240 reads, with respect to each of the searched-out conversion paths, the following data from the all-users information DB 220. The data to be read are: a transmission corresponding to the second communication means before conversion, conversion accuracy of each of the conversion means used on the conversion path, and a reception score corresponding to the first communication means after conversion.

The calculator 240 then calculates, for each of the conversion paths, a product of the transmission score corresponding to the second communication means before conversion, the conversion accuracy of each of the conversion means used on the conversion path, and the reception score corresponding to the first communication means after conversion. The thus-calculated product of the scores indicates the communication establishment possibility. Note that the communication establishment possibility is not necessarily calculated as the product of scores and conversion accuracy, and other methods may be employed as long as the possibility is obtained on the basis of the scores and the conversion accuracy.

Referring to FIG. 12 as a concrete example, assume a path through which "English text" is converted into "Japanese text" by use of English-Japanese translation. As the communication establishment possibility using this path, calculated is a product of: 80% that is the transmission score of English text, 70% that is the accuracy of English-Japanese machine translation, and 90% that is the reception score of Japanese text. The value of the product is 50.4%, for example.

Meanwhile, assume a path through which "English speech" is converted into "Japanese text" by sequentially using English speech recognition and English-Japanese machine translation, for example. As the communication establishment possibility using this path, calculated is a product of: 50% that is the transmission score of English speech, 70% that is the accuracy of English speech recognition, 70% that is the accuracy of English-Japanese machine translation, and 90% that is the reception score of Japanese text. The value of the product is 22.05%, for example.

Hence, the calculator 240 calculates products of scores for bidirectional communication. Thereafter, the calculator 240 determines, for each combination of the first and second communication means, a smaller one of the following values as the communication establishment possibility by the first and second users. The determination is made from among: the maximum value of the communication establishment possibilities each based on the product of a transmission score of the first user and a reception score of the second user (first possibilities) (refer to FIG. 11); and the maximum value of the communication establishment possibilities each based on the product of a transmission score of the second user and a reception score of the first user (second possibilities) (refer to FIG. 12).

The calculator 240 selects the combination of communication means corresponding to the thus-determined possibility, and then calculates, as the index value, the communication establishment possibility using this combination of communication means. The combination of communication means selected here includes a total of four communication means for: transmission by the first user, reception by the first user, transmission by the second user, and reception by the second user.

Hereinafter, the above processing of the calculator 240 will be explained by use of mathematical expressions. To begin with, scores of the skill of avatar A in receiving and transmitting language l are respectively set as $P_{IN}(A, l)$ and $P_{OUT}(A, l)$. Each of these takes a value within the range of a real number not less than zero. The larger the value, the higher the skill indicated by the value. Since this value is not a probability value, all the scores of language skills of a user do not necessarily add up to 1.

Then, a language $l_{A \to B}$ appropriate for transmitting information from avatar A to avatar B is calculated as shown in the following Equation (4).

$$l_{A \to B} = \underset{l \in L}{\operatorname{argmax}} P_{OUT}(A, l) \cdot P_{IN}(B, l) \qquad \text{Equation (4)}$$

Here, L denotes a group of all useable communication means. Similarly, a language $l_{B \to A}$ appropriate for transmitting information from avatar B to avatar A is calculated as shown in the following Equation (5).

$$l_{B \to A} = \underset{l \in L}{\operatorname{argmax}} P_{OUT}(B, l) \cdot P_{IN}(A, l) \qquad \text{Equation (5)}$$

Since the smaller one of the above values indicates the communication establishment possibility between the two avatars, the possibility is calculated as shown in the following Equation (6).

$$P = \min(P_{OUT}(A, l_{A \to B}) \cdot P_{IN}(B, l_{A \to B}), \qquad \text{Equation (6)}$$
$$P_{OUT}(B, l_{B \to A}) \cdot P_{IN}(A, l_{B \to A}))$$

In addition, here, consider a case where two avatars using different languages are to communicate while each of the avatars is set to use the same language as the transmission and reception languages, or while machine translation is provided, if needed, between the two avatars. In this case, the possibility of establishment of communication can be calculated by the following Equation (7) employing a conversion accuracy $T(l, l')$ of translation.

$$(l_A, l_B) = \underset{l,l' \in L}{\operatorname{argmax}} P(A, l) \cdot T(l, l') \cdot P(B, l'), \qquad \text{Equation (7)}$$
$$P = P(A, l_A) \cdot T(l_A, l'_B) \cdot P(B, l'_B)$$

Note that the performance of each avatar in transmission and reception of a language is assumed to be the same and is expressed as P (A, 1). The performance of machine translation is also assumed to be the same in both directions.

In addition to the above-mentioned example, the calculator 240 may determine a higher communication establishment possibility when the communication from a first user to a second user and the communication in the reverse direction are in balance. For example, the calculator 240 may evaluate a higher possibility when the difference between the scores of the first and second communication means is smaller, than when the difference between the scores is larger.

As yet another example, the calculator 240 may determine the communication establishment possibility using the first and second communication means, on the basis of the scores of the first and second communication means respectively weighted with the priority levels thereof. This allows a user to reflect his/her preference in the communication means to be used, thereby encouraging even more appropriate communication between the users.

Now the explanations for FIGS. 6 to 12 are completed and the description goes back to FIG. 5. The virtual world browser 102 then displays the displayed object representing the second avatar in a form by which the intensity of the relationship can be distinguished. The virtual world browser 102 displays the object according to a calculated or updated index value (S530).

A form by which the intensity of the relationship can be distinguished is, for example, expressed as a direction that an avatar faces. If an avatar in an intense relationship with a user is displayed in a manner that the avatar looks at the user on the user's screen, the user can recognize the intensity of the relationship between him/herself and the avatar. Hereinbelow, a concrete method for implementing such a display will be described with reference to FIG. 13.

FIG. 13 shows a relationship between the directions that avatars 1 and 2 are facing. The location of avatar 1 is represented by a coordinate $P_A=(x_A, y_A, z_A)$. The direction that avatar 1 is facing is represented by a normal vector $d_A=(u_A, v_A, w_A)$. The location of avatar 2 is represented by a coordinate $P_B=(x_B, y_B, z_B)$. The direction that avatar 2 is facing is represented by a normal vector $d_B=(u_B, v_B, w_B)$.

Under this condition, first, prepared are two functions shown in the following Equation (8).

$$f_A(x, y, z) = u_A(x - x_A) + v_A(y - y_A) + w_A(z - z_A),$$
$$f_B(x, y, z) = u_B(x - x_B) + v_B + (y - y_B) + w_B(z - z_B),$$
Equation (8)

In order for avatar 2 to be included in the visible range of avatar 1, the following condition of Equation (9) needs to be satisfied.

$$f_A(x_B, y_B, z_B) \ge T_V L_{AB} \qquad \text{Equation (9)}$$

Here, $T_V$ is a threshold indicating the visible range, and $L_{AB}$ is a distance between avatars 1 and 2. Note that the direction vector is normalized to unit length. Meanwhile, a condition for avatar 1 to be included within a range where avatar 2 can view by turning its head is expressed in the following Equation (10).

$$f_B(x_A, y_A, z_A) \ge T_R L_{AB} \qquad \text{Equation (10)}$$

Here, $T_R$ is a threshold corresponding to an upper limit for turning the head. The 3D processing unit 130 modifies the three-dimensional shape in the partial 3D model DB 110 so that avatar 2 turns its head and tilts it in the direction expressed by Equation (11). These movements are to be made only when both conditions, Equations (9) and (10), are satisfied.

$$(u, v, w) = \alpha(P_A - P_B)/L_{AB} + (1 - \alpha)d_B \qquad \text{Equation (11)}$$

Here, $\alpha$ is a real number that takes a value between 0 and 1, and may be an index value P itself indicating the intensity of the relationship. If $\alpha$ is 1, avatar 2 turns to avatar 1. If $\alpha$ is zero, avatar 2 does not change its direction. As has been described, the modified three-dimensional shape is rendered by the 2D rendering unit 140 and the thus-rendered image is then displayed on the display device 150.

By performing control in this way, the display device 150 can display avatar 2 so as to face a modified direction. Consequently, an angle formed by a direction that the avatar 1 is facing and the modified direction that the avatar 2 is facing is smaller in a case where the relationship is more intense, than a case where the relationship is less intense. Additionally, the display device 150 can modify the direction of the eyes of avatar 2 within a range satisfying the following condition. That is, an angle formed by a direction that avatar 2 is facing and a direction of the eyes thereof should be smaller than a predetermined reference.

Note that although the "direction" modified here should preferably be the direction of the eyes that changes according to the movement of the head or face, the "direction" is not limited to this. For example, the display device 150 may alternatively change the direction that the avatar is facing.

Alternatively or additionally, the display device 150 may change the action or facial expression of the avatar. One example will be described with reference to FIG. 14.

Figure 14:
FIG. 14 shows an example of a procedure for changing the facial expression of an avatar.
Figure 14:
Figure 14:
Figure 14:
Figure 14:
Figure 14:
Figure 14:
Figure 14:
Figure 14:
Figure 14:
Figure 14:
Figure 14:
Figure 14:
Figure 14:
Figure 14:
Figure 14:
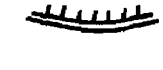

FIG. 14 shows an example of a procedure for changing the facial expression of an avatar. The display device 150 changes the facial expression of an avatar according to a predetermined procedure. FIG. 14 illustrates a procedure of changing the eyes of an avatar, as an example.

In a case where the parameter that defines the facial expression of the avatar is set to 1, the display device 150 sequentially displays images of the eyes corresponding to patterns 1 to 8 at a predetermined time interval.

Patterns 4 and 8 show images of closed eyes, for example, while the other patterns show images of opened eyes. As a result, the eyes of the avatar are displayed as sometimes being closed, and most other times being opened.

If an index value indicating the intensity of the relationship between the first and second avatars is changed to a value larger than a predetermined reference, the display device 150 changes the parameter for changing the predetermined procedure to change the facial expression of the second avatar.

When the parameter is changed from 1 to 2, for example, images of closed eyes are additionally displayed in patterns 2 and 6. As a result, the eyes of the avatar are displayed so as to blink frequently.

The exemplar display of the eyes as described above is merely one example. Alternatively, the display device 150 may change a so-called facial expression parameter or an action parameter which are parameters that define the animation pattern of an avatar.

With such changes made in the parameter, a facial expression or a representation of an avatar may be changed to show its friendly feeling, for example. Moreover, an avatar's feeling can be expressed by causing the avatar to repeat an action such as jumping or floating in the air.

Figure 15:
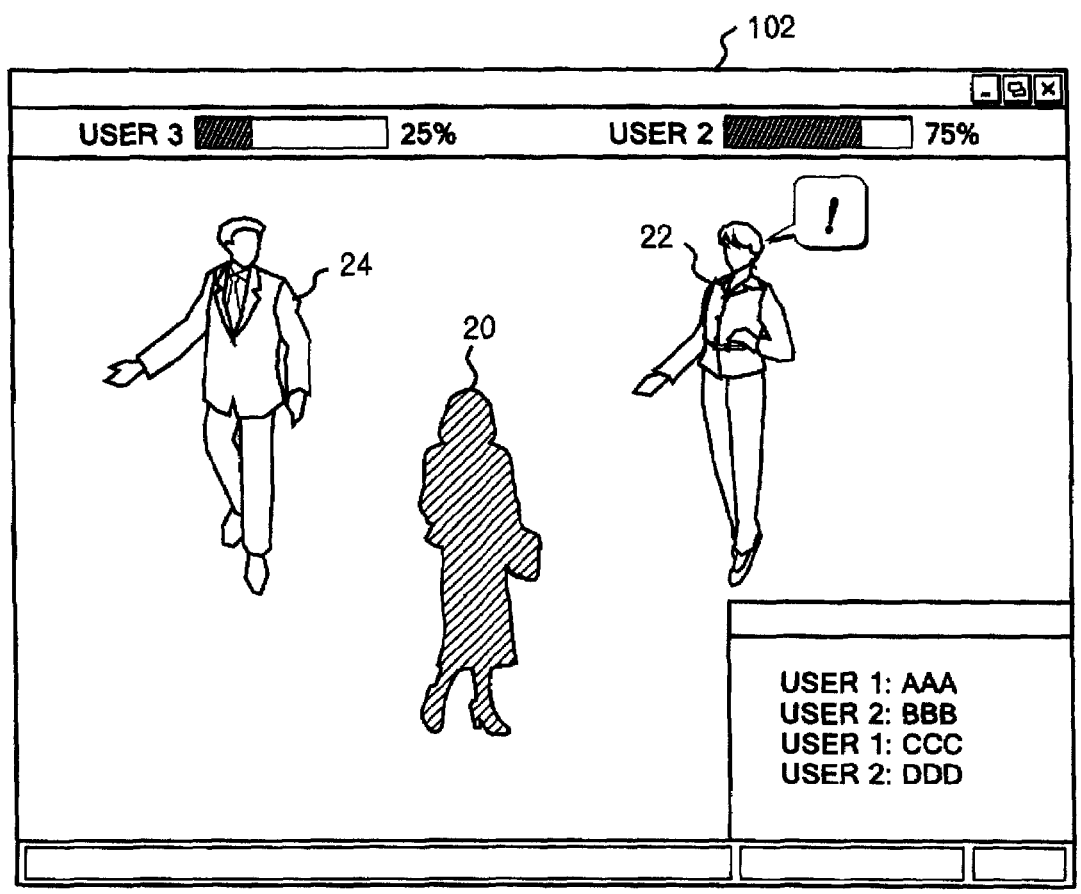
FIG. 15 shows another example of a screen displayed by the virtual world browser 102 according to the embodiment.

FIG. 15 shows another example of a screen displayed by the virtual world browser 102 according to the embodiment. As similar to the example in FIG. 2, the virtual world browser 102 displays, to a user, an image as viewed through the eyes of an avatar serving as a character representing the user in the virtual world. The avatar 20 in the near side of the screen represents an avatar operated by the user of the client computer 100. Meanwhile, each of the avatars 22 and 24 in the far side of the screen is assigned to a different user and represents an avatar operated by the different user.

However, unlike the example in FIG. 2, the virtual world browser 102 displays a different avatar having a relationship with the avatar 20 at intensity higher than a predetermined reference, in a form distinguishable from other different avatars. Specifically, the avatar 22 in FIG. 15 is an avatar having a relationship with the avatar 20 at a higher intensity than a predetermined reference. Accordingly, the virtual world browser 102 displays the avatar 22 with an exclamation mark balloon added thereto.

As has been described with reference to FIG. 14, a distinguishable form includes not only this example with a balloon but also various forms such as those with its facial expressions or actions changed. Further, the virtual world browser 102 may additionally display the index value itself indicating the intensity of the relationship.

In the example in FIG. 14, the virtual world browser 102 displays, for every avatar (user), the index value itself and a level meter indicating the index value on the HUD (head up display). In this way, the user can recognize the intensity of the relationship in more detail.

As another example, the virtual world browser 102 may modify an attribute of the avatars 20 or 22 according to the intensity of the relationship. As mentioned above, an attribute includes a component of the avatar or a location of the avatar, in addition to a direction that the avatar is facing.

One example of changing an attribute is to change the color of a component. That is, for example, the virtual world browser 102 may change the color of clothes or an accessory worn by the avatar 22 has an intense relationship with the avatar 20. By changing the color of these components to a noticeable color such as gold, or to a predetermined color that the user of the client computer 100 prefers, the user of the client computer 100 can easily recognize the intensity of the relationship.

Figure 16:
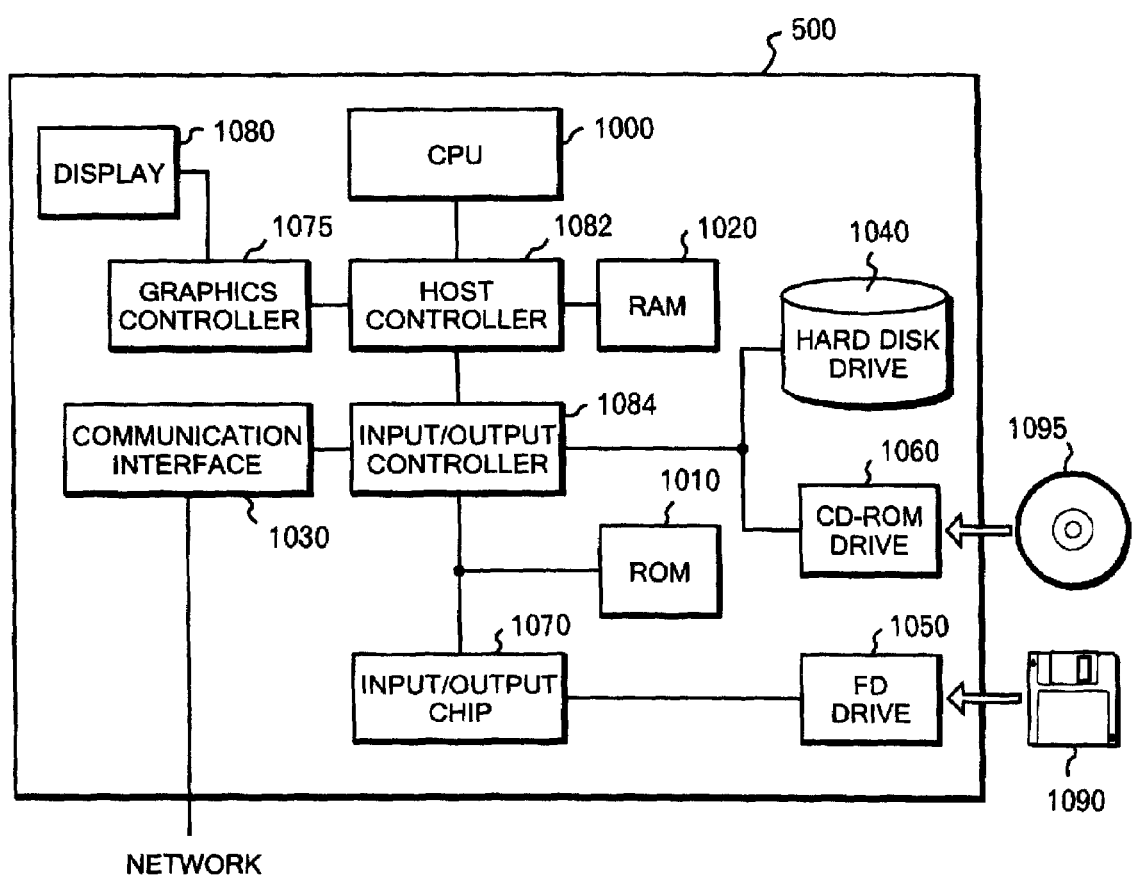
FIG. 16 shows an example of a hardware configuration of a computer 500 functioning as the client computer 100 or the server computer 200 according to the embodiment.

FIG. 16 shows an example of a hardware configuration of a computer 500 functioning as the client computer 100 or the server computer 200 according to the embodiment. The computer 500 consists of a CPU peripheral unit, an input/output unit and a legacy input/output unit. The CPU peripheral unit includes a CPU 1000, a RAM 1020 and a graphics controller 1075 mutually connected by a host controller 1082. The input/output unit includes a communication interface 1030, a hard disk drive 1040 and a CD-ROM drive 1060 which are connected to the host controller 1082 by an input/output controller 1084. The legacy input/output unit includes a ROM 1010, a flexible disk drive 1050 and an input/output chip 1070 which are connected to the input/output controller 1084.

The host controller 1082 connects the RAM 1020 to the CPU 1000 and the graphic controller 1075, both of which access the RAM 1020 at a high transfer rate. The CPU 1000 operates on the basis of a program stored in the ROM 1010 and the RAM 1020 and controls each of the components. The graphics controller 1075 obtains image data that the CPU 1000 generates on a frame buffer provided in the RAM 1020, and displays the image on a display 1080. Alternatively, the graphics controller 1075 may include therein a frame buffer for storing image data generated by the CPU 1000.

The input/output controller 1084 connects the host controller 1082 to relatively high-speed input/output devices which are the communication interface 1030, the hard disk drive 1040 and the CD-ROM drive 1060. The communication interface 1030 is one example of the communication interface 106 or 206 explained with reference to FIG. 1, and communicates with external devices through a network. The hard disk drive 1040 is one example of the storage device 104 or 204 explained with reference to FIG. 1, and stores a program and data used by the computer 500. The CD-ROM drive 1060 reads a program or data from a CD-ROM 1095 and provides the program or data to the RAM 1020 or the hard disk drive 1040.

Moreover, relatively low-speed input/output devices such as the ROM 1010, the flexible disk drive 1050 and the input/output chip 1070 are connected to the input/output controller 1084. The ROM 1010 stores a boot program that the CPU 1000 executes at the boot-up of the computer 500, and also stores programs that are dependent on hardware of the computer 500. The flexible disk drive 1050 reads a program or data from a flexible disk 1090 and provides the program or data to the RAM 1020 or the hard disk drive 1040 through the input/output chip 1070. In addition to the flexible disk drive 1050, the input/output chip 1070 connects various input/output devices via a parallel port, a serial port, a keyboard port, a mouse port, for example.

A program provided to the computer 500 is stored in a recording medium such as the flexible disk 1090, the CD-ROM 1095, an IC car, and is provided by a user. The program is read from the recording medium through the input/output chip 1070 and/or the input/output controller 1084, and then installed to the computer 500 to be executed. The operation that the program causes the computer 500 to perform is the same as the operation of the client computer 100 or the server computer 200 explained with reference to FIGS. 1 to 15, and accordingly the explanations thereof will be omitted.

The program as has been described may be stored in an external recording medium. As the recording medium, an optical recording medium such as a DVD or a PD, a magneto-optical recording medium such as an MD, a tape medium, a semiconductor memory such as an IC card may be used in addition to the flexible disk 1090 and the CD-ROM 1095. Instead, the program may be provided to the computer 500 via a network by using, as a recording medium, a storage device such as a hard disk or a RAM provided in a server system connected to a dedicated communication network or the Internet.

Hereinabove, the present invention has been described by means of an embodiment. However, the technical scope of the present invention is not limited to the scope of the above embodiment. It will be clear to those skilled in the art that various modifications and refinements may be added to the above embodiment. For example, the selection unit 250 may automatically equip an avatar (that is, to set the avatar in an immediately usable state) with a conversion means on a conversion path selected as having the highest communication establishment possibility. In addition, a distinguishable display of an avatar with a less intense relationship instead of an avatar with an intense relationship can satisfy users that seek broader communication. It is clear from the scope of claims that such modified or improved embodiment can be included in the technical scope of the present invention.

What is claimed is:

1. A system for supporting communication among users, comprising:
   a storage device for storing each of at least one communication means used by each user, in association with a score indicating a skill level of the user for transmitting and receiving information when using the communication means and a conversion accuracy of each conversion means that converts one communication means into another communication means;
   a search unit for searching out, from the storage device, at least one first communication means used by a first user and at least one second communication means used by a second user, wherein each communication means can be used in common by both the first and second user; and
   a selection unit for reading, from the storage device, the scores of the first and second users for each of the searched-out communication means, and then selecting a communication means to be used in the communication between the first and second users, on the basis of the read scores; wherein the search unit searches out, from the first communication means, any of the first communication means that can be matched with any of the second communication means through conversion using any of the conversion means and searches out a plurality of conversion paths each allowing at least one of the conversion means to convert the first communication means into any one of the second communication means; and
   the selection unit reads, from the storage device, the score corresponding to the searched-out first communication means, the conversion accuracy corresponding to the conversion means that causes the first communication means to match the second communication means, and the score corresponding to the second communication means;
   the selection unit determines a communication establishment possibility between the first and second users, wherein each of the scores and the conversion accuracy takes a value between zero and a predetermined constant value, by calculating, for each of the searched-out conversion paths, a product of the score corresponding to the first communication means before conversion, the conversion accuracy corresponding to each of the conversion means on the conversion paths, and the score corresponding to the second communication means after conversion, and determining the communication establishment possibility between the first and second users on each of the searched-out conversion paths on the basis of the calculated product; and
   the selection unit selects a communication means to be used in the communication between the first and second users based on the communication establishment possibility.

2. The system according to claim 1, wherein each of the communication means indicates a language for communication, and the conversion means is a machine translation system.

3. The system according to claim 2, wherein:
   each of the communication means indicates that the type of data to be transmitted and received is text data or speech data; and
   the conversion means includes a text-to-speech synthesis system and a speech recognition system.

4. The system according to claim 1, wherein:
   the storage device stores a transmission score and a reception score of each user, the transmission score indicating a skill level in using each communication means for transmission of information, the reception score indicating a skill level in using each communication means for reception of information;
   the selection unit calculates, for each of the searched-out communication means, a set of first possibilities and a set of second possibilities, the first possibilities each indicating a communication establishment possibility based on a product of the transmission score of the first user and the reception score of the second user, the second possibilities each indicating a communication establishment possibility based on a product of the reception score of the first user and the transmission score of the second user; and
   the selection unit determines a smaller one of the maximum values respectively of the first and second possibilities, as the communication establishment possibility using the communication means.

5. The system according to claim 1, wherein
   the selection unit evaluates a higher communication establishment possibility in a case where the product of the scores respectively corresponding to the searched-out first and second communication means is higher, than the possibility in a case where the product is lower, as well as evaluating a higher communication establishment possibility in a case where a difference between the scores is smaller, than the possibility in a case where a difference between the scores is larger.

6. The system according to claim 1, wherein:
   the storage device stores a priority level for each user of preferentially using each communication means in association with the communication means; and
   the selection unit determines a communication establishment possibility using the searched-out first and second communication means, on a basis of the scores corresponding to the first and second communication means respectively weighted with the priority levels corresponding to the first and second communication means.

7. The system according to claim 1, further comprising a display for displaying an avatar representing each of the users in a virtual world, wherein
   if the avatar of the second user is included within a visible range of the avatar of the first user, the display displays, on a screen showing the visible range of the first avatar, the avatar of the second user distinguishably in terms of the communication establishment possibility.

8. A method for supporting communication among users by use of a computer, the computer including a storage device for storing each of at least one communication means used by each user, in association with a score indicating a skill level of the user for transmitting and receiving information when using the communication means and a conversion accuracy of each conversion means that converts one communication means into another communication means, the method comprising the steps of:
   searching out, from the storage device, at least one communication means that first and second users can use in common by searching out, from the first communication means, any of the first communication means that can be matched with any of the second communication means through conversion using any of the conversion means and searching out a plurality of conversion paths each allowing at least one of the conversion means to convert the first communication means into any one of the second communication means; and;

reading, from the storage device, the scores of the first and second users, indicating a skill level of each user for transmitting and receiving information when using the searched-out communication means and the score corresponding to the searched-out first communication means, the conversion accuracy corresponding to the conversion means that causes the first communication means to match the second communication means, and the score corresponding to the second communication means; and selecting a communication means to be used in the communication between the first and second users, by determining a communication establishment possibility between the first and second users on at least one searched-out conversion path, wherein each of the scores and the conversion accuracy takes a value between zero and a predetermined constant value, by calculating, for each of the searched-out conversion paths, a product of the score corresponding to the first communication means before conversion, the conversion accuracy corresponding to each of the conversion means on the conversion paths, and the score corresponding to the second communication means after conversion, and determining the communication establishment possibility between the first and second users on each of the searched-out conversion paths on the basis of the calculated product and selecting a communication means to be used in the communication between the first and second users based on the communication establishment possibility.

9. A non-transitory computer program storage medium having a computer usable program code configured to carry out instructions for causing a computer to perform the steps of:

searching out, from the storage device, at least one communication means that first and second users can use in common by searching out, from the first communication means, any of the first communication means that can be matched with any of the second communication means through conversion using any of the conversion means and searching out a plurality of conversion paths each allowing at least one of the conversion means to convert the first communication means into any one of the second communication means; and;

reading, from the storage device, scores of the first and second users, indicating a skill level of each user for transmitting and receiving information when using the searched-out communication means and a score corresponding to the searched-out first communication means, a conversion accuracy corresponding to a conversion means that causes the first communication means to match the second communication means, and a score corresponding to the second communication means; and selecting a communication means to be used in the communication between the first and second users, by determining a communication establishment possibility between the first and second users on at least one searched-out conversion path, wherein each of the scores and the conversion accuracy takes a value between zero and a predetermined constant value, by calculating, for each of the searched-out conversion paths, a product of the score corresponding to the first communication means before conversion, the conversion accuracy corresponding to each of the conversion means on the conversion paths, and the score corresponding to the second communication means after conversion, and determining the communication establishment possibility between the first and second users on each of the searched-out conversion paths on the basis of the calculated product and selecting a communication means to be used in the communication between the first and second users based on the communication establishment possibility.

* * * * *